I. P. Tice.
Spirit-Meter.
Nº 72698. Patented Dec. 24, 1867.

Witnesses  Inventor

I. P. Tice.
Spirit Meter.

№ 72698        Patented Dec. 24, 1867

Witnesses.        Inventor.

J. M. Coombs      Isaac P. Tice
A. Lelberg

United States Patent Office.

ISAAC P. TICE, OF NEW YORK, N. Y.

Letters Patent No. 72,698, dated December 24, 1867.

---

IMPROVEMENT IN SPIRIT-METERS.

---

The Schedule referred to in these Letters Patent and making part of the same.

---

TO ALL WHOM IT MAY CONCERN:

Be it known that I, ISAAC P. TICE, of the city, county, and State of New York, have invented a new and useful Improvement on Spirit-Meters, of which the following is a full, clear, and exact description, reference being had to the accompanying drawing, forming part of this specification, and in which—

Figure 1:
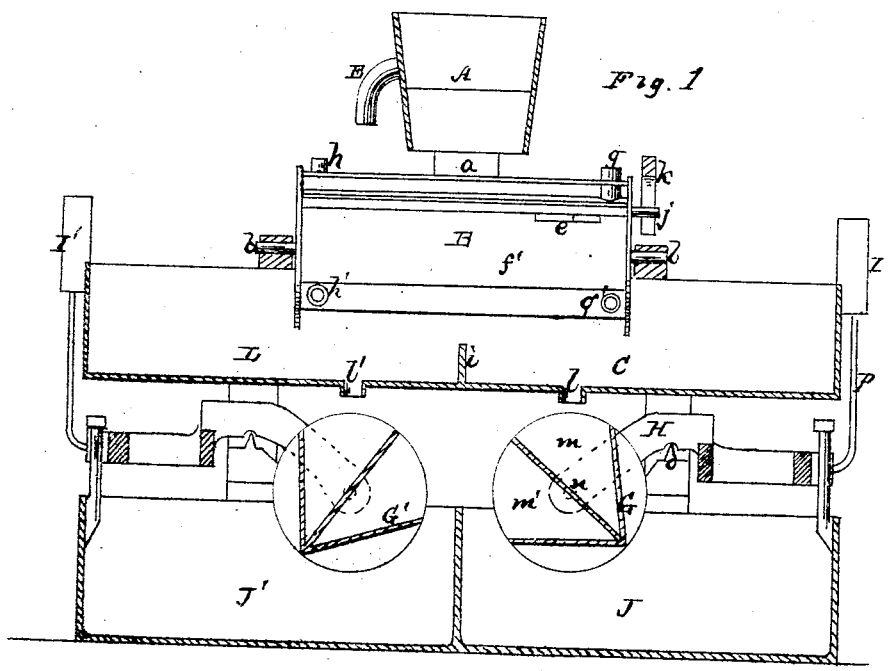
Figure 3:
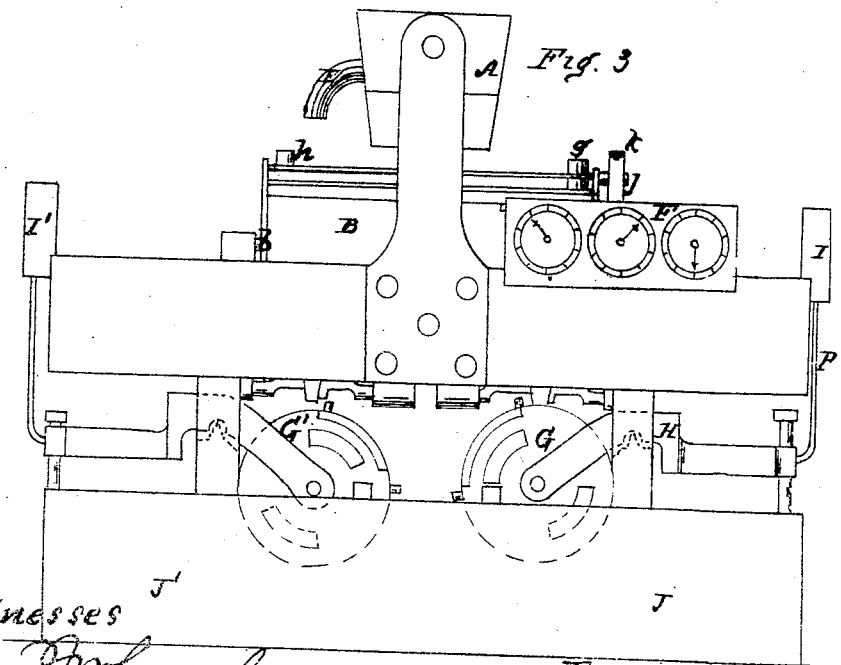
Figure 2:
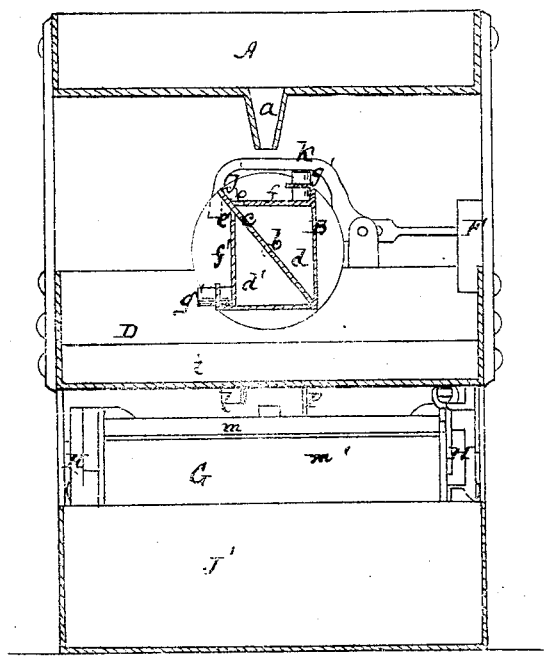

Figures 1 and 2 represent sectional elevations, at right angles to each other, of a spirit-meter, or meter in part, embracing my improvement, and Figure 3 a side elevation of the same.

Similar letters of reference indicate corresponding parts.

My improvement in spirit-meters consists in a measuring-can, so constructed and operating as that, after the measuring-chamber has been filled with fluid, a surplus will so load the can as to cause it to tilt and empty its contents, in such a manner as that the measured quantity or volume, and the surplus or unmeasured quantity, will be discharged into different receivers.

Said invention also consists in a combination of measuring-can and weighing-can or cans, separate and distinct from each other, in such manner as that the several operations of these devices will give the specific gravity of the fluids by weight and measure.

The invention also consists in providing a spirit-meter with a plurality of weighing and measuring-cans, in such manner as that a fixed quantity of spirit, apart from the aggregate passing through the meter, may be measured and weighed for determining the proof; also consists in an extra weighing-device, for registering the surplus spirit that does not pass through the proof or measuring-cans; likewise in an arrangement of pipe in the primary receiver which carries to the surplus weighing-can the overflow from said receiver that does not pass into the measuring or proof-can.

Referring to the accompanying drawings, A represents the hopper, into which the products of the still are allowed to run by a spout or outlet, $a$, beneath which is arranged a rotary or curvilinearly-tilting measuring-can, B, working on an axis or shaft, as at $b$, and divided, say, by a diaphragm, $c$, into measuring-chambers $d\ d'$, that alternately receive the fluid into them through openings $e\ e'$, while surplus spirit running on to the can is caught by tray-formations $f\ f'$ on the outside of it, so constructed as that either measuring-chamber alternately becoming top or side-heavy, by the excessive weight of the surplus on the side or edge of its tray farthest from the opening $e$ or $e'$, causes the can to tilt, and to bring the other of such measuring-chambers, by its opening $e$ or $e'$, under the spout $a$, the can, in tilting, which it does alternately in opposite directions, emptying its measured quantity in the chamber $d\ d'$, through a spout, $g$ or $g'$, (which, in the tilting of the can, assumes a horizontal position or thereabouts,) into a trough or receiver, C, while the surplus spirit on the tray $f$ or $f'$, and which produced the tilting of the can, is emptied by spouts $h$ or $h'$ into a receiver, D, separated by a partition, $i$, from the receiver C. The hopper A is also provided with an overflow-pipe, E, or its equivalent, over and above the level necessary to supply the measuring-can and its trays, and arranged to conduct such overflow into the trough D. Stops may be applied to the can B, to arrest it at the terminations of its tilting-strokes; and said can is further provided with a pin, $j$, operating alternately on opposite sides of a yoke, $k$, or otherwise furnished with suitable devices to register, on a registering-apparatus, F, the number of tilts of the can B, and consequently the quantities passing out of the chambers $d\ d'$, knowing the capacity of the latter, into the trough C. The spirit thus measured into C passes out therefrom through an aperture, $l$, into one or other chambers $m\ m'$ alternately, of a rocking or tilting weighing-can, G, turning on a centre as at $n$, and carried by a beam, H, supported on a knife-edge, $o$, which beam is connected by a rod, $p$, with a registering-apparatus, I, for, by the weight of the fluid each time a chamber, $m$ or $m'$, is filled, or the can tilted, registering the weight of the measured fluid, the beam H not tipping till a specified weight, sufficient to tilt the can, has been received by the latter, which, in tilting, delivers into a receiver, J. Stops may be provided the weighing-can G, to arrest its action at the termination of a tilting-stroke; and it may be further provided with pins or projections, acting against an air-dash pot or cushion to break shock at the end of a tilting-stroke.

Any other suitable weighing-can and registering-arrangement, however, may be used. The surplus or overflow-spout received into the trough D, passes out through an aperture, $l'$, into a second and similar, but separate and distinct weighing-can, G', emptying into a receiver, J', and registering the weight on a registering-apparatus, I'.

Thus, it will be seen that the measuring-can B, and weighing-can G, combined, give the precise weight of a given quantity of spirit, from which the specific gravity and proof are readily determined, and that the surplus or overflow being also weighed by a separate cam, G', the specific gravity of which is necessarily the same, the whole quantity of spirit passing through the meter, and proof of the same, are, by the several indexes of the different registering-apparatuses, easily reckoned.

What I claim, and desire to secure by Letters Patent, is—

1. A measuring-can, so constructed and operating as that, after the measuring-chamber has been filled with fluid, a surplus will so load the can as to cause it to tilt, and empty its contents, in such a manner as that the measured quantity or volume, and the surples or unmeasured quantity, will be discharged into different receivers, substantially as specified.

2. The combination of a measuring-can and weighing-can or cans, separate and distinct from each other, so that the several operations of these devices will give the specific gravity of the fluid by weight and measure.

3. In a spirit-meter, the use of a plurality of weighing and measuring-cans, arranged and operating in such manner as that a fixed quantity of spirit, apart from the aggregate passing through the meter, is measured and weighed for determining the proof, essentially as herein set forth.

4. In combination with a measuring-can, an extra or separate weighing-can, for weighing the surplus or overflow not passed through the measuring-can, substantially as specified.

5. The combination, with a primary receiver, A, of an overflow-pipe, or its equivalent, arranged to conduct the surplus supply from said receiver to the surplus weighing-can, or receiver connected therewith, essentially as herein set forth.

ISAAC P. TICE.

Witnesses:
   A. LE CLERC,
   J. W. COOMBS.